(12) United States Patent
Groll

(10) Patent No.: US 6,267,830 B1
(45) Date of Patent: Jul. 31, 2001

(54) METHOD FOR MAKING A COPPER CORE FIVE-PLY COMPOSITE FOR COOKWARE

(75) Inventor: William A. Groll, McMurray, PA (US)

(73) Assignee: Clad Metals LLC, Canonsburg, PA (US)

( * ) Notice: Subject to any disclaimer, the term of this patent is extended or adjusted under 35 U.S.C. 154(b) by 0 days.

(21) Appl. No.: 09/304,927

(22) Filed: May 4, 1999

Related U.S. Application Data

(60) Provisional application No. 60/084,177, filed on May 4, 1998.

(51) Int. Cl.$^7$ .............................. A47J 36/02; B23K 20/04; B32B 15/18; B32B 15/20
(52) U.S. Cl. ..................... 148/531; 148/532; 428/653; 428/685; 428/652; 228/160; 228/190; 228/235.3; 220/573.1
(58) Field of Search ..................... 428/685, 652, 428/653, 674; 126/390; 220/573.1; 228/235.3, 235.2, 160, 190; 148/531, 532, 534

(56) References Cited

U.S. PATENT DOCUMENTS

| | | |
|---|---|---|
| 2,053,096 | 9/1936 | Kay et al. ................... 53/1 |
| 2,841,137 | 7/1958 | Chace ..................... 126/390 |
| 2,941,289 | 6/1960 | Chace ..................... 29/544 |
| 3,064,112 | 11/1962 | Hanzel et al. ............. 219/44 |
| 3,251,660 | 5/1966 | Finsterwalder ........... 29/196.3 |
| 3,298,803 | 1/1967 | Ulam ..................... 28/196.3 |
| 3,490,126 | 1/1970 | Miller ..................... 29/196.3 |
| 3,735,615 | 5/1973 | Shneider ................... 72/75 |
| 3,810,287 | * 5/1974 | Pryor et al. .............. 29/191.6 |
| 3,832,147 | 8/1974 | Forand, Jr. ............... 29/191 |
| 3,854,193 | * 12/1974 | Yamaguchi et al. ......... 29/473.9 |
| 3,912,152 | * 10/1975 | Forand ..................... 228/190 |
| 3,952,938 | * 4/1976 | Ulam ..................... 228/190 |
| 4,004,892 | 1/1977 | Ulam ..................... 29/196.2 |
| 4,013,211 | * 3/1977 | Atman ..................... 228/126 |
| 4,103,076 | * 7/1978 | Ulam ..................... 128/653 |
| 4,167,606 | * 9/1979 | Ulam ..................... 428/653 |
| 4,246,045 | * 1/1981 | Ulam ..................... 148/11.5 Q |
| 5,551,415 | * 9/1996 | Cartossi ................... 126/390 |
| 5,952,112 | * 9/1999 | Spring ..................... 428/653 |

OTHER PUBLICATIONS

Merriman, A.D., A Dictionary of Metallurgy, "Cold Working", pp. 40–41, (No month) 1958.*

* cited by examiner

Primary Examiner—John J. Zimmerman
(74) Attorney, Agent, or Firm—Webb Ziesenheim Logsdon Orkin & Hanson, P.C.

(57) ABSTRACT

A 5-ply composite metal product for the manufacture of cookware is provided which contains a relatively thick copper core having relatively thin layers of pure aluminum bonded between outer layers of stainless steel. The cooking vessels made therefrom may contain a decorative groove or skived ring around a perimeter of the vessel, formed by machining away the outer layers of stainless steel and pure aluminum to visually expose the copper core.

8 Claims, 2 Drawing Sheets

METHOD FOR MAKING A COPPER CORE FIVE-PLY COMPOSITE FOR COOKWARE

CROSS-REFERENCE TO RELATED APPLICATION

This application claims the benefit of U.S. Provisional Application Serial No. 60/084,177 filed May 4, 1998.

BACKGROUND OF THE INVENTION

The present invention relates generally to multi-ply composite metal products for cookware and, more particularly, to copper core, stainless steel clad composites for enhancing the thermal conductivity, corrosion resistance and cosmetic appearance in cookware products.

Stainless steel has long been recognized for its value as a corrosion resistant, highly ductile material in the manufacture of food preparation and handling equipment. Stainless steel is, however, a poor conductor of heat and many techniques have been conceived and developed to combine more heat conductive metals such as copper or aluminum with stainless steel. Copper is the most conductive of commercially available metals. A popular method of comparing the thermal conductivity of various metals is to assign copper a conductivity of 100%. By way of comparison, aluminum is approximately 55% the conductivity of copper and stainless steel possesses only 3% of the thermal conductivity of copper.

The direct bonding of stainless steel to copper is possible by several different methods, but each of these methods has serious drawbacks. The following is a brief review of these methods.

The first is the slab method which involves assembling thick plates of stainless steel and copper, first either by welding or explosion bonding. The bonded plates are then hot and cold rolled down to a usable gauge. The highest permissible hot working processing temperature for copper and lowest hot working processing temperature for stainless steel have a very small overlap. This leads to the necessity for multiple reheats and many steps in handling and processing. This technique is expensive and inherently has a low material yield, making it economically unfeasible for light gauges useful in the manufacture of cookware products such as pots and pans.

The second method of bonding is the cold reduction technique. Copper and stainless steel may be bonded by means of high rolling reduction at room temperature. However, the equipment to do this, in any other but very light gauges, would be extremely massive and is not available. The technique also requires a final anneal which once again raises the problem of dissimilar processing temperature ranges for stainless steel and copper.

The third method of bonding involves brazing. The direct brazing of copper and stainless steel is possible, but this practice requires the use of expensive silver based brazing agents, making the process economically unfeasible at this gauge. The resultant product also has some inherent forming limitations.

In pursuit of an economical combination of stainless steel with a conductive material, the cookware industry has adopted stainless steel bonded to one or both sides of aluminum. This material arrangement features ease of bonding and high product yield. The bonding process is done by heating and rolling and does not impose enough reduction in the stainless steel to require a post-bond anneal before forming. The processing temperature does not exceed 800° F., which is well below the 1050° F. at which stainless steel and aluminum begin to form an undesirable brittle intermetallic. Aluminum's lightweight and easy cold working make it a suitable material for the manufacture of high quality cookware. The aluminum core of such a product is usually an "Alclad" type product which is a prebonded strip of aluminum with a very thin skin of a higher purity aluminum (EC grade, or 1100, 1130, 1230, 1175, 7072, 1050, 1145, 1060 and like 1000 series alloys, etc.) on the exterior and an aluminum alloy core. The pure aluminum is needed in proximity to the stainless steel to achieve a suitable bond and the aluminum alloy core is present for its deep draw characteristic due to its higher strength. The aluminum alloy layer also prevents the "orange peel" phenomenon which would cause a rough texture on the exterior surface of the drawn product. Because of the nature of its grain, this can occur when a core of solid pure aluminum is used.

Despite its superior heat flow conductivity, the difficulties cited above have prevented copper from being used as a practical core material. U.S. Pat. No. 4,246,045 by John B. Ulam attempts to combine the desirable properties of a copper core with the ease of aluminum/stainless steel bonding. According to his work, the product is made by starting with an aluminum/copper/aluminum prebond sheet in which both aluminum components are of an Alclad type.

The copper cored prebond sheet is formed by cold reduction at room temperature. The '045 Ulam patent teaches that the presence of the Alclad aluminum prevents the occurrence of orange peel. The pure aluminum surfaces of the prebond core, according to the Ulam process, are cleaned and conditioned by chemical or abrasive means, then heated and bonded to stainless steel by methods similar to the bonding of aluminum cored stainless steel. The resulting 9-ply composite material is then deep drawn, by traditional means, into a cooking vessel.

In pursuit of a copper cored material for use in cookware, my work has led to close scrutiny of the '045 Ulam patent. I have found that important aspects of Ulam's teachings are contrary to the results of my experimental work.

SUMMARY OF THE INVENTION

The present invention provides a superior 5-ply composite product for the manufacture of grills and cooking vessels and other food preparation equipment as well as to a method for producing the same. The layers of the composite product include stainless steel on both exterior surfaces and a core of solid copper. A thin layer of high purity aluminum is located between each interface between the copper core and the stainless steel exteriors. The above material combines the heat flow properties of copper and aluminum with the cosmetic property and formability of stainless steel.

The method of the present invention comprises the steps of providing a core layer of relatively pure copper such as, for example, C-102 grade high purity copper and two thin sheets of pure aluminum, such as EC grade or 1000 series grade aluminum. The copper and aluminum sheets are cleaned and then joined by cold rolling the aluminum to both sides of the copper core at a reduction of about 50%. The copper core, aluminum prebonded composite is then heat treated to strengthen the bond. Two layers of relatively light gauge stainless steel are then bonded to the copper core-pure aluminum prebonded composite by hot rolling in preferably two rolling reductions carried out at about 20%–30% total hot reduction to produce a 5-ply composite. The 5-ply copper core, aluminum-stainless clad composite is then heat treated to strengthen the roll bonded product. The 5-ply product of the invention may then be shaped by conventional deep forming means by drawing, for example, into a cooking vessel of desired shape such as a fry pan, sauce pan, stock pot or the like, and polished.

The present invention further provides cookware having an improved cosmetic appearance by virtue of a decorative skived groove or ring formed around a lower, outer perimeter of the cooking vessel to visually expose the copper core. This distinctive cosmetic feature is accomplished by skiving, i.e., machining away the outer layers of stainless steel and pure aluminum to a depth of cut of about 0.015 inch and a width of about 0.25 inch to visually expose the copper core. More than one skived ring may be formed, if desired, to alter the cosmetic appearance of the cooking vessel. The exposed ring of polished copper material formed by the skiving step provides a cosmetically pleasing contrast to the polished stainless steel around the sidewall of the cookware. The complete cutting away of the stainless steel and pure aluminum layers by the skived ring does not adversely affect the thermal conductivity properties along the sidewall of the cooking vessel since the heavy copper core is the essential heat conductor in the 5-ply material of the invention and the copper thickness is not reduced by the skiving operation.

The top edge of the cooking vessel is preferably flared outwardly in a curved or radiused manner and sheared along a vertical axis so that the copper core and stainless steel layers around the top edge perimeter of the cooking vessel are visually exposed to further enhance the cosmetic appearance of the cookware by virtue of the visual contrast between the thick copper core and the adjacent stainless steel layers.

DETAILED DESCRIPTION OF THE INVENTION

Figure 1:
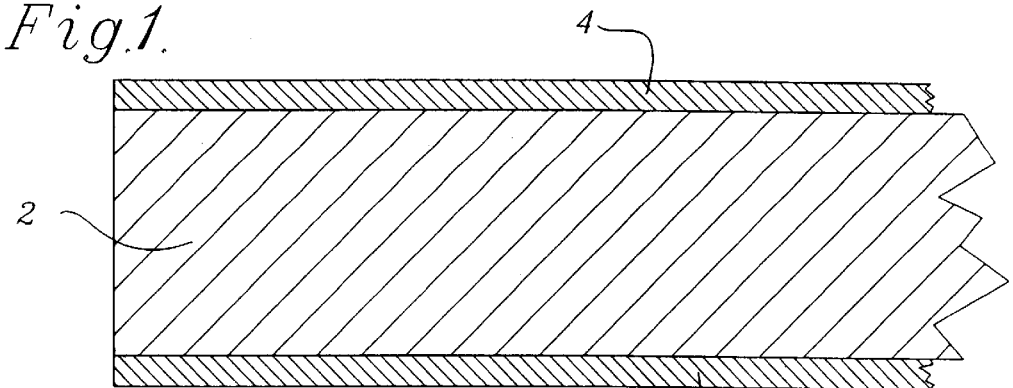
FIG. 1 is a cross-sectional side elevation view of the copper core and pure aluminum layers prior to roll bonding.
Figure 2:
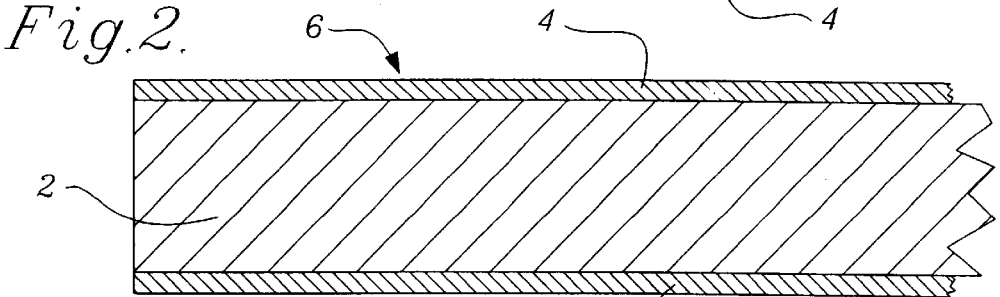
FIG. 2 is a cross-sectional view of the copper and aluminum layers of FIG. 1 after roll bonding forming a prebond composite.
Figure 3:
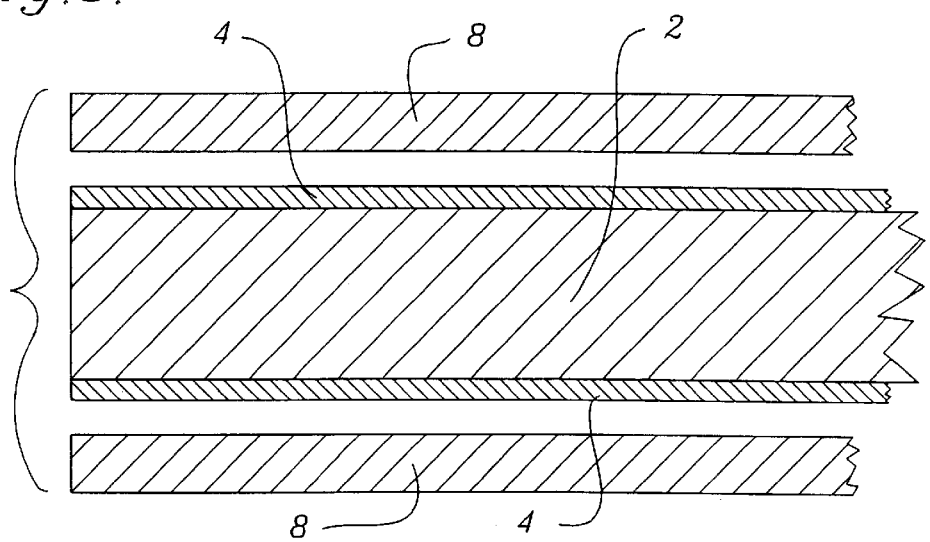
FIG. 3 is a cross-sectional view of the copper-aluminum prebond composite material of FIG. 2 with stainless steel layers prior to roll bonding.
Figure 4:
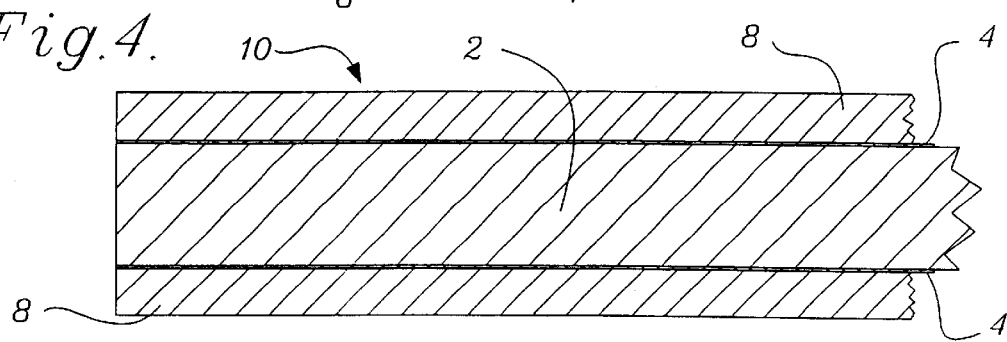
FIG. 4 is a cross-sectional view of the copper, aluminum and stainless steel layers of FIG. 3 after roll bonding, forming the 5-ply composite material of the invention.

The present invention described below and depicted in the drawings provides a copper core, stainless steel composite and a method to produce the product which exhibits excellent bond integrity and manufacturing economics, superior to those taught by prior art. The interior of this material comprises a three-ply, prebonded composite 6 of pure or high purity aluminum 4 (hereinafter referred to as "pure aluminum") on both sides of a copper core 2. The thickness of the layers of pure aluminum 4 is minimized and is intended to act as "metallurgical glue" to bond the copper and stainless steel together. The prebond composite sheet 6 of pure aluminum 4-copper 2-pure aluminum 4 is made by roll bonding the three stacked sheets by way of a cold reduction at room temperature at about 50% reduction. FIG. 1 depicts the layers of pure aluminum 4 positioned on opposed sides of the copper core 2 prior to roll bonding. The 3-ply composite sheet, after cold reduction bonding, is depicted in FIG. 2 and referred to as the prebonded composite sheet 6. A post cold roll heating of the prebond composite sheet 6 at moderate temperature not to exceed 550° F. is also conducted to improve the bond strength. The surfaces of the pure aluminum layers 4 of the prebond composite sheet 6 are chemically or mechanically cleaned to remove surface oxides, oils, grease and other contaminants and placed between the sheets of stainless steel 8. The entire stacked array depicted in FIG. 3 is then heated to a temperature of between 520°–600° F., with the narrower range of 550°–580° F. preferred. The heated, stacked array of FIG. 3 is then fed into the bite of a rolling mill. A reduction of 2% to 10% is taken on a first rolling pass and a reduction of 10% to 30% is taken on the second pass at the same elevated temperature in a tandem mill to produce the 5-ply composite product 10 of the invention depicted in FIG. 4. A post hot roll heating of the 5-ply composite 10 then takes place at a temperature not to exceed 550° F. As soon as the temperature is homogeneously achieved within the rolled 5-ply composite 10, the rolled material is cooled with no extended holding time at the elevated temperature. The resulting material displays excellent bond strength at all metal interfaces and possesses the necessary ductility for deep forming.

It is the intent of this technique to minimize the amount of heat input to the material at the prebond and postbond stages. I have found that any excessive heat (550° to 600° F.) or the prolonged exposure to heat promotes the formation of a brittle intermetallic between the copper and aluminum of the prebond sheet. This intermetallic causes a separation of clad layers during forming. It must be noted, however, that if not enough heat has saturated the various layers, the stainless steel to aluminum bond will be weak or nonexistent at the prescribed reductions. This fact leads to another important and distinct aspect of the present invention. My experimental work has indicated that minimizing aluminum thickness in any roll bond composite leads to a greater bond strength. I attribute this to the relative amount of the reduction with respect to the arc of contact of the bonding rolls. A low yield strength material such as aluminum at an elevated temperature will tend to extrude toward the entry side of a rolling mill as it is rolled. The result is lower separating force on the rolls, hence, less compressive force on the material interface. The prebond copper composite sheet 6 of the present invention acts as one metal during rolling by virtue of the thin, pure aluminum layers 4. When the higher yield strength copper core 2 is maximized as a percentage of thickness, the yield strength of the core is naturally higher, allowing for greater final bond strength at lower temperatures. The practice of including Alclad layers of aluminum, as taught by the '045 Ulam patent, necessitates a greater overall thickness of aluminum which works counter to the evidence of the present invention. The use of Alclad material also tends to make the prebond material more expensive. Furthermore, the minimization of the pure aluminum thickness in layers 4 also minimizes the influence of any possible orange peel effect that could occur as a possible side effect of the pure aluminum. When the pure aluminum thickness is kept to a minimum, this effect is inconsequential. A presently preferred prebond composite 6 comprising pure aluminum clad copper may, for example, have a total thickness on the order of 0.090 inch prior to bonding with the stainless steel wherein each layer 4 of pure aluminum occupies no more than about 10% of the total prebond core composite thickness. Hence, each pure aluminum layer 4 is about 0.009 inch in thickness prior to roll bonding with the outer layers 8 of stainless steel.

Despite its excellent heat flow characteristic, copper is a very heavy metal with a density more than three times that of aluminum. The final product should contain a copper layer 2 thick enough to be highly functional, but not as much as to make the weight of the vessel impractical. The actual intended use of the particular vessel will determine how much copper is necessary.

In this example, for a prebond composite sheet 6 having a total thickness of 0.090 inch, each pure aluminum layer 4 is about 10% of the total prebond sheet thickness or 0.009 inch and the thickness of the inner layer of copper is about 80% of the total thickness of the prebond sheet or about 0.072 inch. The term "pure aluminum" as used herein includes, for example, EC grade aluminum, and high aluminum content alloys, such as the 1000 series aluminum alloy family. After roll bonding with the outer layers 8 of stainless steel, the 5-ply composite 10 of the present invention, in a presently preferred embodiment, has an overall thickness of about 0.072 inch which is particularly suitable for the manufacture of various sizes of cookware. By way of example, such a 5-ply composite 10 of 0.072 inch in thickness would have a copper core 2 of 0.036 inch in thickness, having pure aluminum layers 4 having a thickness of 0.004 inch each, and outer layers 8 of stainless steel of 0.014 inch in thickness. The 5-ply stacked array of metal sheets shown in FIG. 3 in this example employed type 304 stainless steel layers 8, each having a thickness of 0.017 inches prior to hot rolling.

Figure 5:
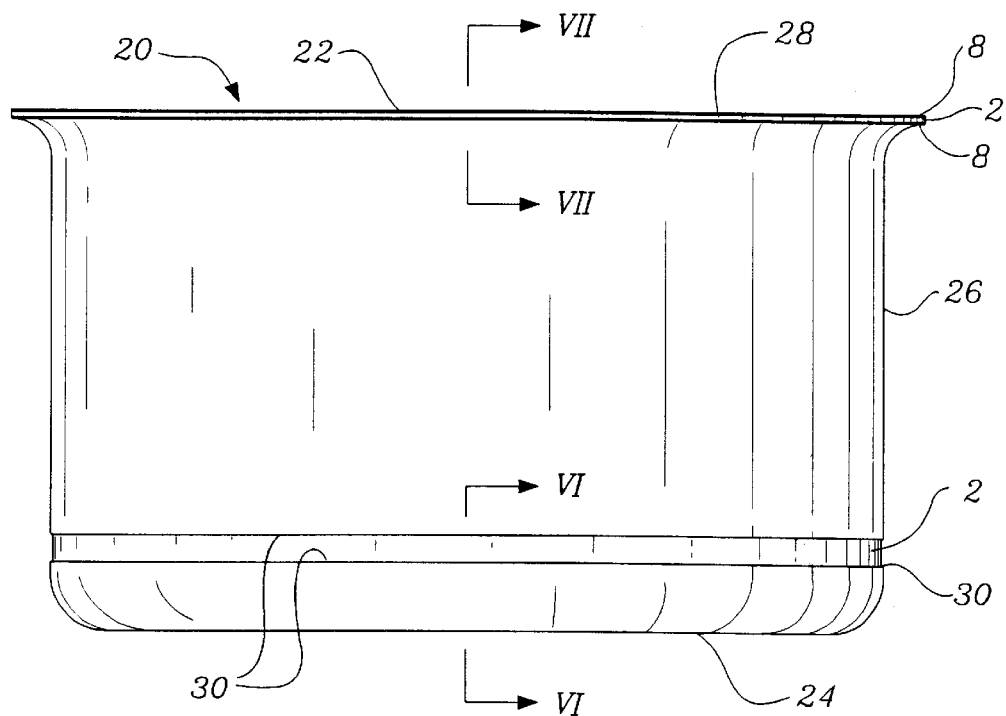
FIG. 5 is a side elevation view of a cooking vessel made according to the present invention.

The 5-ply composite 10 in the form of a metal sheet having a thickness of 0.072 inch with individual layer thicknesses of copper, pure aluminum and stainless steel, as discussed above, was formed into a cooking vessel 20, shown in FIG. 5, by a drawing operation. Drawing of composite metal sheet is well-known and may be conducted in a double action press or in a hydroform machine or the like. Of course, it will be understood that various types and sizes of cookware, such as fry pans, sauce pans, stock pots, roasting and baking pans and the like can be made from the 5-ply composite 10 of the invention.

The cooking vessel 20 depicted in FIG. 5 is in the shape of a sauce pan or stock pot and includes an open top 22, a bottom 24 and a sidewall 26. The top 22 of the vessel 20 may be given an outwardly radiused finish 27 during the drawing operation. A trim die may then be employed to shear a formed edge 28 which is substantially parallel to the sidewall 26. The formed edge 28 is rounded at a radius of three-eighths inches, for example. A vertical cut by the trim die across the radius reveals the copper core along a nonnormal plane which maximizes the copper exponent. The formed edge 28 provides visual exposure of the copper core 2 sandwiched between the layers of stainless steel 8 to enhance the cosmetic appearance of the vessel 20.

Figure 6:
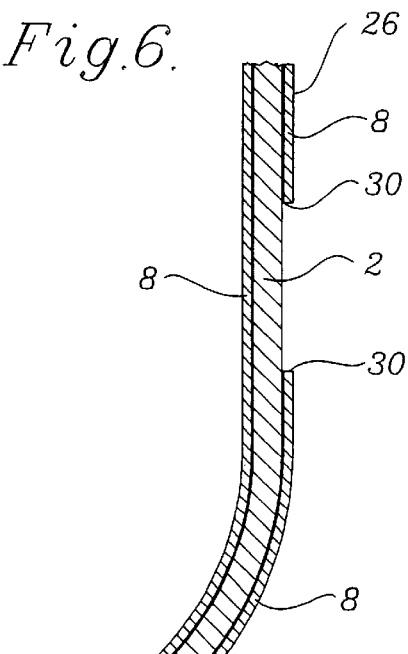
FIG. 6 is a cross-sectional side view of the sidewall of the cooking vessel of FIG. 5 taken along section line VI—VI showing a portion of the machined skive ring of the invention.
Figure 7:
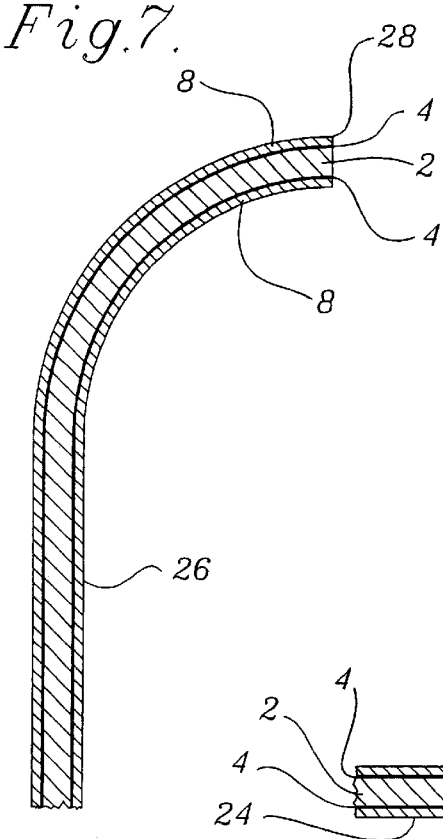
FIG. 7 is a cross-sectional side view of a portion of the sidewall of the cooking vessel of FIG. 5 take along section line VII—VII showing the upper edge of the cooking vessel of the invention.

The appearance of the vessel 20 is still further dramatically improved by the addition of a skived decorative ring 30 in the nature of an indented groove formed around the perimeter of the vessel near the bottom 24 thereof. The skived decorative ring 30 is formed by cutting away the outer stainless steel layer 8 and pure aluminum layer 4 to visually expose the copper core 2 around the perimeter of the sidewall 26 as shown in FIGS. 5 and 6. In the present example, the copper core 2 is visually exposed by machining at a depth of cut of about 0.015 inch into the vessel sidewall 26. The machining of the skived ring 30 is preferably conducted on a programmable CNC lathe which rotates the vessel 20 as a stationary cutting tool forms the ring 30. The decorative ring 30 may be cut to a width of about one-fourth inch, for example. If desired, more than one decorative skived ring 30 may be provided to achieve a still different cosmetic appearance.

After the formed edge 28 is sheared, the rough edge is smoothed by facing the top edge 28 with a stationary tool as the vessel is rotated. The vessel 20 is then buffed and polished to a high luster. The visual contrast between the polished stainless steel of the sidewall 26 and the copper core 2 along the skived ring 30 is very distinctive and visually attractive. Likewise, the formed edge 28 is cosmetically enhanced by the contrasting copper core 2 and stainless steel layers 8 which are visually apparent therearound.

The stainless steel layers 8 preferably are made from type 304 grade. If desired, a ferritic, magnetic grade of stainless steel of the 400 series may be used as the exterior layer in order to make the vessel compatible with induction cooking ranges. The copper material for copper core 2 is preferably C102 high purity copper. The higher the copper content, the greater the heat conductivity. The thin, pure aluminum layers 4 which provide the "metallurgical glue" for roll bonding the stainless steel to the copper core 2 permit the thickness of the copper core 2 to be maximized which, otherwise, would be diminished by the presence of the aluminum alloy layers in the Alclad material of the prior art '045 Ulam patent.

Thus, the invention provides enhanced cooking characteristics with an enhanced cosmetic appearance because the copper core 2 is maximized in thickness due to the fact that the pure aluminum layers have been minimized in thickness.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

I claim:

1. A method of making a 5-ply composite metal product comprising the steps of:

providing a prebonded composite consisting of a copper core having pure aluminum cold roll bonded on opposed sides of the copper core, said prebonded composite being free from one or more aluminum alloy layers; and bonding a sheet of stainless steel to the pure aluminum on opposed sides of said prebonded composite to provide the 5-ply composite metal product, consisting essentially of layers of stainless steel, pure aluminum, copper, pure aluminum and stainless steel, wherein the copper layer has a thickness greater than any of the other layers, and wherein the aluminum layers each have a thickness less than any of the other layers, wherein the prebonded composite is formed by cold rolling a high purity copper sheet and pure aluminum sheets at a reduction of about 50% followed by a post cold roll heating at a maximum temperature of 550° F., and wherein said bonding of the stainless steel to the prebonded composite is carried out by hot rolling comprising the steps of heating the stainless steel and the prebonded composite to a temperature of between 520°–600° F. and rolling the metals in a stacked array in a first rolling pass at a reduction of 2% to 10% and in a second rolling pass at a reduction of 10% to 30%, followed by a post hot roll heating not to exceed 600° F. to achieve temperature homogeneity within the rolled metals, followed by immediate cooling to avoid formation of brittle intermetallic compounds between the copper and aluminum.

2. The method of claim 1, wherein the pure aluminum is one selected from the group consisting of EC grade and high aluminum content alloys of the 1000 series and wherein said each pure aluminum layer represents about 10% of a thickness of the prebonded composite and the copper core represents about 80% of said thickness.

3. The method of claim 1, further including the step of forming the 5-ply composite metal product into a shaped cooking vessel by drawing.

4. The method of claim 3, further including the step of forming at least one skived ring around a perimeter of the cooking vessel by machining away an outer layer of stainless steel and pure aluminum to visually expose the copper core.

5. The method of claim 3, further including the step of forming a radiused sidewall at a top around said cooking vessel and shearing said radiused sidewall along a vertical axis to visually expose said copper core and stainless steel layers along a cross section of said 5-ply composite metal defining a top edge which is substantially parallel with the vessel sidewall.

6. A method of making a 5-ply composite metal cooking vessel comprising the steps of:

providing a copper sheet;

providing two sheets of pure aluminum free from one or more layers of aluminum alloy, wherein each sheet of pure aluminum has a thickness of no more than about 10% of a thickness of the copper sheet;

cleaning facing sides of the pure aluminum sheets and the copper sheet;

cold rolling a stacked array of the pure aluminum sheets and copper sheet, and reducing said array about 50% to form a prebonded 3-ply composite sheet comprising a copper core positioned between layers of pure aluminum;

heating the 3-ply composite sheet up to 550° F.;

providing two sheets of stainless steel, wherein each of said sheets of stainless steel have a thickness less than a thickness of said copper core and greater than a thickness of each pure aluminum layer in said cold rolled 3-ply composite sheet, cleaning facing surfaces of said stainless steel sheets and the pure aluminum surfaces of said prebonded 3-ply composite sheet and placing said cleaned facing surface of each of said stainless steel sheets on a cleaned surface of the pure aluminum surfaces of the 3-ply composite to form a 5-ply stacked array;

heating the 5-ply stacked array to a temperature of between 520°–600° F. and hot rolling said 5-ply stacked array in a first rolling pass at a reduction of 2% to 10% and in a second rolling pass at a reduction of 10% to 30% to form a 5-ply composite sheet;

heating the 5-ply composite sheet after hot rolling to a temperature not to exceed 600° F. to achieve temperature homogeneity within the 5-ply composite sheet, followed by immediate cooling; and forming the 5-ply composite sheet into a desired cooking vessel configuration.

7. The method of claim 6, further including the step of forming at least one skived ring around a perimeter of the cooking vessel by machining away an outer layer of stainless steel and pure aluminum to visually expose the copper core.

8. The method of claim 6, further including the step of forming a radiused sidewall at a top around said cooking vessel and shearing said radiused sidewall along a vertical axis to visually expose said copper core and stainless steel layers along a cross section of said 5-ply composite metal defining a top edge which is substantially parallel with the vessel sidewall.

* * * * *